United States Patent Office 2,923,731
Patented Feb. 2, 1960

---

2,923,731

PREPARATION OF LITHIUM TETRAMETHOXY-BORATE

George Lewis Cunningham and Frank Pretka, Cleveland, Ohio, assignors to Callery Chemical Company, Pittsburgh, Pa., a corporation of Pennsylvania No Drawing. Application March 19, 1956
Serial No. 572,202

7 Claims. (Cl. 260—462)

This invention relates to a method of preparing lithium tetramethoxyborate [$LiB(OCH_3)_4$] from other alkali metal tetramethoxyborates and more particularly to its preparation by metathetic reaction of anhydrous lithium chloride and another alkali metal tetramethoxyborate in solvent alcohol.

Sodium borohydride can be prepared from sodium hydride and methyl borate in solvent systems at low temperatures according to the equation $$4NaHBH_4 + 4B(OCH_3)_3 = NaBH_4 + 3NaB(OCH_3)_4$$

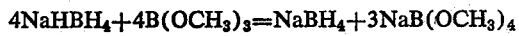

It is economically imperative that methyl borate be recovered from the by-product sodium tetramethoxyborate. Since tetramethoxyborates dissociate thermally to yield methyl borate and the corresponding metal methoxide, the methyl borate can be recovered from the byproduct by heating to cause thermal decomposition. Sodium tetramethoxyborate, however, is relatively stable and has at 280° C. a dissociation pressure of only about 31 millimeters of mercury. At a temperature sufficiently high to dissociate the sodium tetramethoxyborate to methyl borate other side reactions occur reducing the yield of methyl borate and contaminating the product. In contrast, lithium tetramethoxyborate has a dissociation pressure of 100 millimeters of mercury at only about 260° C. and dissociates cleanly to methyl borate without any side reactions.

Also, since lithium tetramethoxyborate decomposes without side reactions to lithium methoxide and methyl borate, it is possible to produce high purity lithium methylate from lithium tetramethoxyborate rather than from the old and more expensive reaction of lithium metal and methanol.

It is an object of this invention to provide a method of preparing lithium tetramethoxyborate by a metathetic reaction of a lithium halide such as lithium chloride and another alkali metal tetramethoxyborate in solvent methanol.

Other objects of this invention will become apparent as described in the specification and the claims hereinafter related.

This invention is based upon our discovery that a lithium halide such as lithium chloride and a tetramethoxyborate salt of an alkali metal other than lithium will react in methanol solution to produce a solid alkali metal halide and a solution of lithium tetramethoxyborate. Lithium tetramethoxyborate may be recovered from the solvent methanol by crystallization or by evaporation of the solvent.

The invention is operable if a solution of lithium chloride in methanol is mixed with a solution of alkali metal tetramethoxyborate in methanol, or if solid lithium chloride is mixed with a solution of alkali metal tetramethoxyborate in methanol, or if solid alkali metal tetramethoxyborate is mixed with a solution of lithium chloride in methanol, or if methanol is added to a mixture of solid lithium chloride and solid alkali metal tetramethoxyborate.

In one experiment 157.82 parts of sodium tetramethoxyborate dissolved in 864 parts of anhydrous methyl alcohol was added to 42.4 parts of anhydrous lithium chloride. The resultant slurry was stirred for approximately 4 hours. The slurry was then filtered to remove 43.88 parts of solid sodium chloride. The filtrate was evaporated to dryness to give a product containing approximately 91% lithium tetramethoxyborate.

In another experiment 149 parts of potassium tetramethoxyborate is dissolved in 800 parts of methanol and is added to 39 parts of anhydrous lithium chloride. The resultant slurry is stirred for approximately 4 hours and then filtered to remove 60 parts of solid potassium chloride. The filtrate is a solution containing 120 parts of lithium tetramethoxyborate and about 8 parts KCl. The solvent is evaporated leaving solid lithium tetramethoxyborate.

While we have described several embodiments of our invention it is to be understood that within the scope of the claims appended hereto this information may be practiced otherwise than as specifically described.

Having thus described our invention and the manner in which it is to be performed, what we desire to claim and secure by Letters Patent of the United States is:

1. A method of preparing lithium tetramethoxyborate which consists of reacting a lithium halide and a salt of the class consisting of $NaB(OCH_3)_4$ and $KB(OCH_3)_4$ in methanol, separating the solid alkali halide by-product, and recovering the lithium tetramethoxyborate from methanol solution.

2. A method according to claim 1 in which the alkali tetramethoxyborate is sodium tetramethoxyborate.

3. A method according to claim 1 in which the alkali tetramethoxyborate is potassium tetramethoxyborate.

4. A method according to claim 1 in which a solution of LiCl in methanol and a solution of the alkali metal tetramethoxyborate in methanol are reacted.

5. A method according to claim 1 in which a solution of the alkali metal tetramethoxyborate is reacted with solid LiCl.

6. A method according to claim 1 in which a solution of LiCl in methanol is reacted with the solid alkali metal tetramethoxyborate.

7. A method according to claim 1 in which methanol is added to a mixture of solid LiCl and the solid alkali metal tetramethoxyborate.

References Cited in the file of this patent

Brown et al.: "American Chemical Society Journal," vol. 75 (1953), page 192.

Schlesinger et al.: "American Chemical Society Journal," vol. 75 (1953), page 190.